Figure 1:
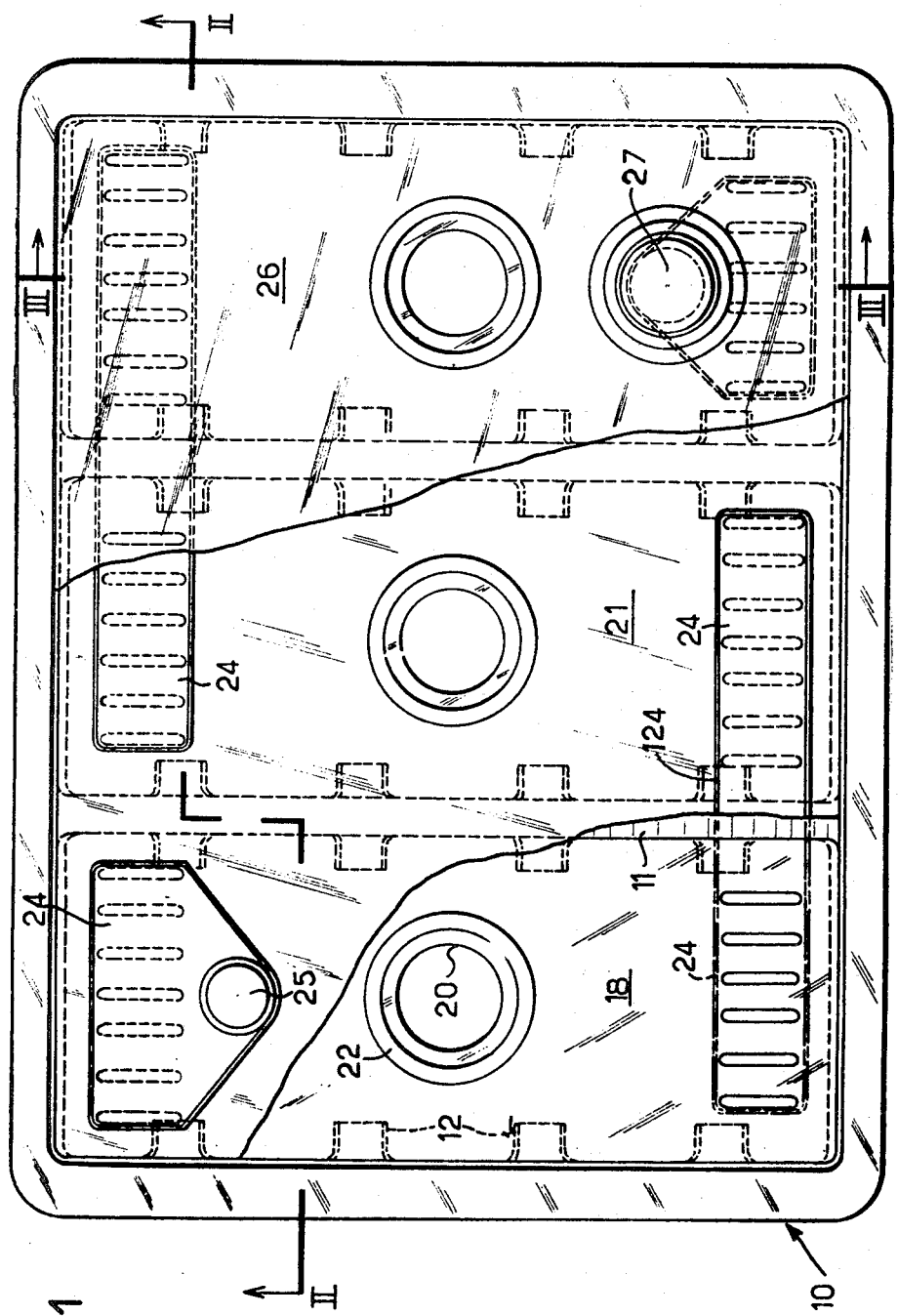

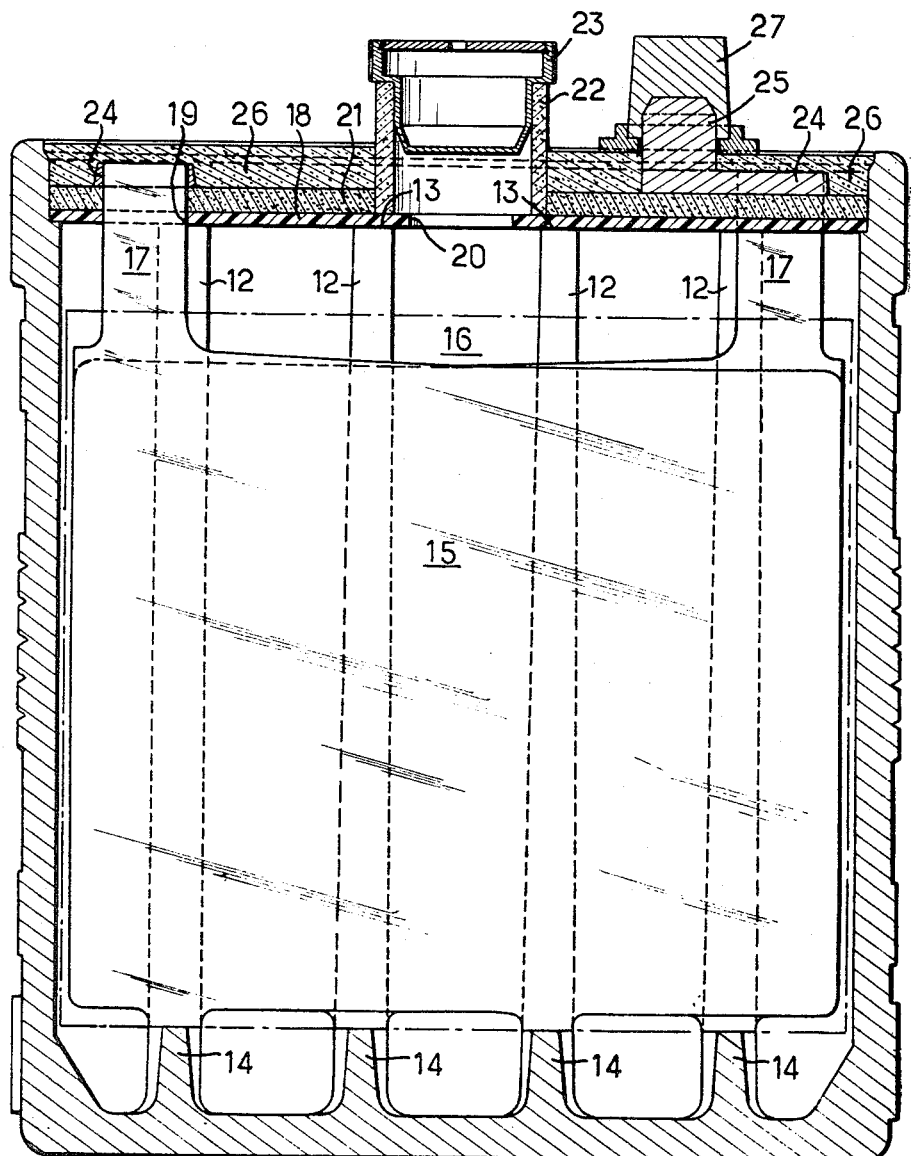

United States Patent Office 3,396,056
Patented Aug. 6, 1968

3,396,056
ELECTRIC STORAGE BATTERIES
François Leon Georges Gonnard, Paris, France, assignor to Baroclem S.A., Courbevoie, Hauts-de-Seine, France, a corporation of France
Filed June 3, 1965, Ser. No. 460,945
Claims priority, application France, June 5, 1964, 977,248
6 Claims. (Cl. 136—6)

This invention relates to a method of assembling electric storage batteries and to batteries made by the method.

As is well understood electric storage batteries are usually formed by the electric association of battery elements situated in the cells of a case filled with electrolyte, and formed individually by alternate rows of positive plates and negative plates insulated from each other by separators, but electrically connected by connection bars and appropriately arranged connections.

In one known method of assembling the batteries, the groups of positive plates and of negative plates of a cell are produced separately together with the connector bars therefor and separators are then inserted between the plates.

In other known methods, the connection bars are formed separately and are connected to the plates after complete assembly of the cells, inclusive of the separators.

In the two cases mentioned above, the cells are inserted in the ready assembled condition into the compartment or compartments of a case therefor.

Separate covers, or an overall cover or lid, are then placed in position to ensure sealing of the different cells from each other. In these covers there are provided openings to receive rods extending upwards from the plates, which rods render it possible to connect the positive and negative groups of rods of two adjoining cells or which represent the pole terminals. Another opening is contrived for gas venting and for filling with electrolyte.

It is a main object of the present invention to provide a method of assembling electric storage batteries which renders it possible to simplify the production stages, and to reduce the weight of metal needed to form connection pieces for the groups of plates.

According to the invention there is provided a method of assembling an electric storage battery, comprising the steps of disposing in each cell of a case divided into separate side-by-side cells alternate insulated positive and negative plates each provided at the upper end thereof with a shank which extends above the top of the cell and grouping shanks of like polarity at opposite ends of the cell and that groups of shanks of like polarity are disposed alternately at opposite ends of the side-by-side cells, covering the top of each cell with a lid individual thereto and through which said shanks extend, each said lid being provided with a filling opening, covering the cell lids with an overall cover common thereto and through which said shanks project together with filling tubes aligned one with each of said filling openings, connecting groups of shanks of opposite polarity in adjoining cells, with the exception of the group of shanks of one polarity of one end cell and the group of shanks of opposite polarity of the other end cell, by casting molten metal such as lead about the ends thereof projecting above the overall cover, separately connecting the group of shanks of said one polarity of one end cell and the group of shanks of said other polarity of the other end cell by casting molten metal such as lead about the respective ends of the shanks projecting above the overall cover, and applying a pole post to the cast connection for each of the said separately connected groups of shanks of the end cells.

The invention also contemplates an electric storage battery assembled by the said method.

Figure 2:
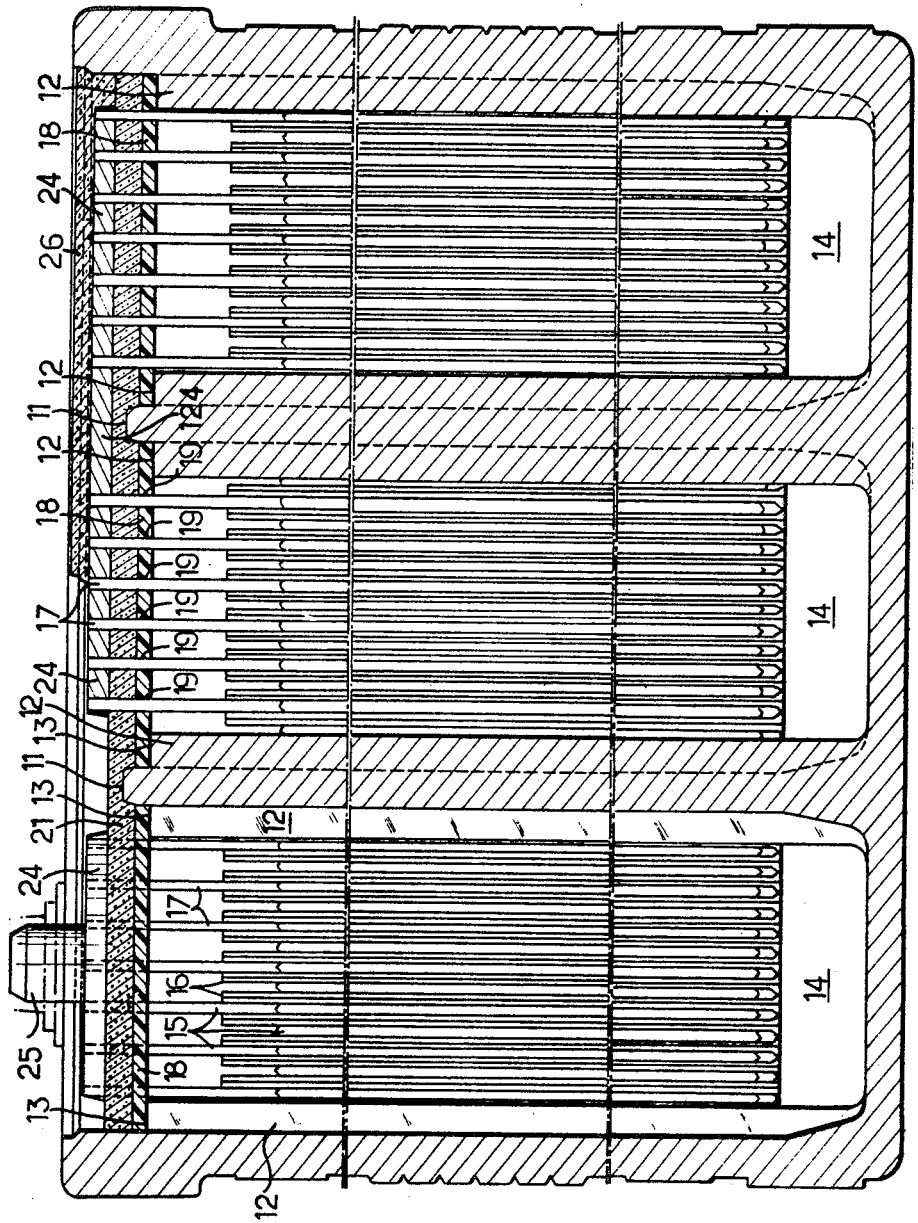

In order that the invention may be clearly understood one embodiment thereof will now be described, by way of example, with reference to the accompanying drawings, in which:

FIG. 1 is a top plan of an electric storage battery constructed according to the invention, with some parts broken away, FIG. 2 is a section on line II—II, FIG. 1, and FIG. 3 is a section on line III—III, FIG. 1.

Referring to the drawings, the electric storage battery comprises a case 10 divided into three compartments or cells by transverse partitions 11 provided with regularly spaced vertical fins 12; the fins 12 extend along almost the full height of the partitions 11 and their upper extremities form shoulders 13, FIGS. 2 and 3. At the bottom of each compartment or cell, those fins 12 which are opposite and aligned with each other are connected by webs 14. Also in each compartment or cell of the case 10 there is disposed a row of plates 15 which rest on the fins 14 in the compartment. Alternate plates in each cell are respectively positive and negative plates and the plates 15 are spaced apart by separators 16 which may, for example, consist of simple corrugated plates made of insulating material. Each plate 15 is provided with a vertical extension or shank 17, and the assembly of the plates 15 is performed in such manner that the shanks 17 are arranged to alternate on opposite sides of the longitudinal axis of the case 10, so that the row of plates 15 of the compartment or cell forms two separate groups one of which is positive and the other negative. The shanks 17 project substantially beyond the tops of the partitions 11.

Each compartment or cell is sealed by a lid 18 made of insulating material and which comprises parallel apertures in the form of slots 19 to provide passages for the shanks 17, and a central filling opening 20. Each lid 18 rests on the shoulders 13 of the fins 12 of the compartment closed by the lid. The insulating material employed to form the lid 18 may, for example, be polyethylene, polystyrene, acrylic polynitrile or other suitable material. Over all the lids 18 there is provided a lower insulating layer 21 which may, for example, be a thermosetting resin such as epoxy resin, or tar, or other suitable material. The layer 21, which forms an overall lid, leaves uncovered the upper extremities of the shanks 17 as well as the openings 20, and retains in position filling tubes 22 which co-operate with the openings 20 and which are closed by removable plugs 23 to allow introduction of the electrolyte and gas venting.

Above the layer 21, the shanks 17 of a group together with those of the aligned group of opposite polarity in an adjoining compartment or cell, are surrounded by unitary masses of metal, such as lead, which form the plate connector pieces 24 and the connector bars 124 which join the connector pieces. The connector pieces 24; 24, 124 are cast in situ by pouring molten metal about the shanks 17 and the extreme junction connector pieces 24 which are isolated and insulated, are each connected to a pole post 25. As shown in the drawings the pole posts are cast to be integral with the connector pieces 24.

For the casting operations, one may employ either individual "ingot moulds," or one mould per battery; these moulds which lack a bottom and rest direct on the layer 21 may be of cast iron, steel, or suitable synthetic material.

The connector pieces 24 are embedded within an upper insulating layer 26 which in addition to the filling tubes 22 leaves only the pole posts 25 uncovered. The pole posts are provided with terminals 27. The upper insulating layer advantageously consists of a layer of tar or resin, or of a mixture of tar and resin.

According to a modification, not illustrated, the plates 15 may include shanks provided with a screw-thread or to which such a thread is applied before application of the lower insulating layer.

Notwithstanding the form chosen, the integral formation in situ of two plate connector pieces and connector bars, renders it possible to reduce the length of metal required, and thus, with uniform section, the weight of metal required, to a degree which may reach 50% as compared with the use of separate plate connector pieces and connector bars for connecting the connector pieces of adjoining cells.

I claim:

1. An electric storage battery comprising a casing divided into separate side-by-side cells, alternate insulated positive and negative plates disposed in each cell, each plate being provided with a shank which extends above the top of the cell, the shanks of one polarity in each cell being grouped at one end of the cell and the shanks of opposite polarty grouped at the opposite end of the cell and the groups of shanks of like polarity being disposed alternately at opposite ends of the side-by-side cells, a cell lid for each cell through which the shanks of the plates in the cell extend, an overall cover common to all cells and through which the plate shanks extend, unitary connecting pieces cast in situ from molten metal such as lead about and connecting shanks of groups of opposite polarity in adjoining cells with the exception of the group of one polarity of one end cell and the group of opposite polarity of the other end cell, an end connection piece for the group of shanks of said one polarity of one end cell and a separate end connection piece for the group of shanks of said opposite polarity of the other end cell, said end connection pieces being cast in situ from molten metal such as lead, and a pole post on each said end connection piece.

2. An electric storage battery according to claim 1, wherein the pole posts are cast to be integral with the end connection pieces.

3. An electric storage battery according to claim 1, including vertical fins extending from opposite sides of each cell, said fins terminating at positions below the tops of the cells and the cell lids resting on the ends of the fins adjacent to the tops of the cells.

4. An electric storage battery according to claim 1, wherein each cell lid consists of a flat sheet of plastics material provided with a filling opening and apertures through which said projections extend out of the cell.

5. An electric storage battery according to claim 1, wherein the overall cover consists of a layer of thermosetting resin cast over the cell lids and around the shanks of the plates without covering the filling openings in the cell lids.

6. An electric storage battery according to claim 1, wherein the overall cover retains in position filling tubes aligned with said filling openings.

References Cited

UNITED STATES PATENTS

| | | |
|---|---|---|
| 1,907,420 | 5/1933 | Finn. |
| 2,287,802 | 6/1942 | Hill. |
| 3,235,412 | 2/1966 | Shannon. |

WINSTON A. DOUGLAS, *Primary Examiner.*

A. SKAPARS, *Assistant Examiner.*